United States Patent [19]

Noguchi et al.

[11] Patent Number: 4,647,631

[45] Date of Patent: Mar. 3, 1987

[54] MODIFIED LIQUID RESOLE PHENOLIC RESINOUS COMPOSITION FOR FRICTION MATERIALS

[75] Inventors: Kenichi Noguchi, Yaizu; Kazuhisa Hirano, Fujieda, both of Japan

[73] Assignee: Sumitomo Durez Company, Ltd., Tokyo, Japan

[21] Appl. No.: 818,143

[22] Filed: Jan. 13, 1986

[30] Foreign Application Priority Data

Jan. 29, 1985 [JP]    Japan .................................. 60-13582

[51] Int. Cl.$^4$ ............................................ C08L 63/02
[52] U.S. Cl. ..................... 525/510; 525/109; 525/489; 525/523
[58] Field of Search ....................... 523/153, 155, 158; 260/998.13; 525/489, 496, 497, 523, 510, 109

[56] References Cited

FOREIGN PATENT DOCUMENTS 572299  3/1959  Canada .

Primary Examiner—Theodore E. Pertilla
Attorney, Agent, or Firm—James F. Tao; James F. Mudd

[57] ABSTRACT

A resinous composition for friction materials, especially for non-asbestos type friction materials is disclosed. The composition is composed of a phenolic resin modified by the reaction product of an acrylonitrile-butadiene liquid rubber with an epoxy resin, and further modification with a triazine resin. This composition when blended with non-asbestos fibers, such as fiberglass, etc., retains the flexibility desired, provides excellent friction characteristics and a reduced wear rate.

15 Claims, No Drawings

MODIFIED LIQUID RESOLE PHENOLIC RESINOUS COMPOSITION FOR FRICTION MATERIALS

BACKGROUND OF THE INVENTION

This invention relates to a resinous composition for friction materials, and especially to resinous compositions for non-asbestos type clutch facings. This composition provides the desired flexibility to the base materials, provides compatability with base materials and provides superior friction characteristics for such applications.

The clutch facing for automobiles and other machines is composed of a base material of asbestos, a binder of thermosetting resin, and organic and inorganic additives. The thermosetting resin used as the binder is an unmodified phenolic resin, or a cashew-modified, oil-modified, or melamine-modified phenolic resin. The melamine-modified phenolic resin is preferred because of its stable friction characteristics.

Recently, there has arisen a demand for improved friction characteristics as the design for improved clutch facing has become more critical. On the other hand, the production of cancer by asbestos has become a social issue. Under these conditions, non-asbestos clutch facing has come into general use. The clutch facing of this type is made of glass fiber as the base material. As compared with the asbestos base material, glass fiber is poor in flexibility and wettability by resins. These disadvantages are amplified where the binder is a conventional melamine-modified phenolic resin. Although flexibility is improved by the use of cashew-modified, oil-modified, or rubber-modified phenolic resin, they lower the coefficient of friction of the resulting clutch facing. Accordingly, there has been a demand for a binder of thermosetting resin which imparts flexibility to the base material, is miscible with the base material, and provides superior friction characteristics.

In order to overcome the above-mentioned disadvantages, the inventors conducted a series of research programs, which led to the findings that a phenolic resin modified with a triazine resin compound and further with a liquid rubber imparts flexibility to the base material, is highly miscible with the base material, and provides superior friction characteristics.

SUMMARY OF THE INVENTION

This invention is concerned with a resinous composition for friction materials comprising a phenolic resin modified with the reaction product of an acrylonitrile-butadiene liquid rubber, an epoxy resin and a triazine resin compound. The resulting composition when used with glass fiber and inorganic and organic additives provides a friction material suitable for automotive clutch plates and the like. This composition provides flexibility to the base material, glass fibers, and easily wets the fiber and provides excellent friction properties.

DETAILED DESCRIPTION OF THE INVENTION

This invention relates to resinous compositions for friction materials. The composition described hereinafter in more detail contains a phenolic resin modified with the reaction product of an acrylonitrile-butadiene liquid rubber and an epoxy resin and a triazine resin compound. The liquid rubber must contain carboxyl groups which react with the epoxy resin.

The acrylonitrile-butadiene liquid rubber (abbreviated as CTBN hereinafter) used in this invention is one which contains carboxyl groups which are reactive toward an epoxy resin. It should preferably contain 5 to 50% of acrylonitrile so that it imparts flexibility, and it should preferably contain 1.5 to 2.5 carboxyl groups per molecule so that it effectively reacts with an epoxy resin. It is desirable for reaction that the carboxyl group is connected to the end of the molecule of the liquid rubber.

The epoxy resin (abbreviated as Ep hereinafter) is intended to improve the miscibility of the binder with the base material. It also helps the chemical bonding between CTBN and phenolic resin. The Ep may be any epoxy compound, and one containing 1.5 to 2.5 epoxy groups per molecule is preferable because of its reactivity. Moreover, one which is liquid at room temperature or has a melting point lower than 120° C. is preferable because of its low viscosity and hence easy reaction.

The reaction of CTBN with Ep should be performed at 120° to 180° C. in the absence or presence of a catalyst until the viscosity does not increase any longer. The catalyst includes, for example, tertiary amines, phosphines, and salts thereof, which are used individually or in combination with one another.

The ratio of CTBN to Ep is determined according to the ratio of the amount of epoxy groups to the amount of carboxyl groups. Where the epoxy group/carboxyl group ratio is low, no chemical bonding is formed between CTBN and phenolic resin, and they are present merely in the form of mixture. This leads to low heat resistance. Conversely, where the ratio is high, the binder lacks flexibility and gelation is liable to occur in the reaction with phenolic resin. Therefore, the epoxy group/carboxyl group ratio should be from 1 to 10, preferably from 1.5 to 5.

The phenolic resin (abbreviated as P hereinafter) is used because of its superior heat resistance. The preferred phenolic resin is a resol type liquid resin which is highly reactive to the epoxy group. Such a phenolic resin is obtained by reacting 1 mol of phenol with 0.8 to 3.0 mol, preferably 1.0 to 2.0 mol, of aldehyde under alkaline conditions of pH 8 to 10. The reaction product of CTBN and Ep is reacted with P at 60° to 100° C. for 30 minutes to 4 hours. (The reaction product of CTBN and Ep is abbreviated as CTBN-Ep, and the reaction product of CTBN-Ep and P is abbreviated as CTBN-Ep-P hereinafter).

CTBN-Ep is used in an amount of 10 to 100 parts (solids), preferably 20 to 80 parts (solids), for 100 parts (solids) of P. The triazine resin is indispensable because of its superior friction characteristics. It is obtained by reacting 1 mol of triazine compound such as melamine, benzoguanamine, or acetoguanamine with 1.0 to 6.0 mol, preferably 2.0 to 4.0 mol, of aldehyde at pH 3.0 to 12.0, preferably under neutral conditions.

The reaction between CTBN-Ep-P and a triazine resin should be carried out at 50° to 100° C. for 10 minutes to 2 hours.

The ratio of CTBN-Ep-P to triazine resin should be 90:10 to 10:90, preferably 20:80 to 70:30, by weight (solids). If the amount of CTBN-Ep-P is small, the resulting composition is poor in flexibility and miscibility with the base material; and if it is large, the coefficient of friction of the resulting composition is low at high temperatures.

The invention is illustrated with the following examples, in which "parts" and "%" means "parts by weight" and "% by weight", respectively.

EXAMPLE

Reaction of CTBN with Ep:

90 parts of acrylonitrile-butadiene liquid rubber containing carboxyl groups (having a number-average molecular weight of 3400 and containing 10% of acrylonitrile and 2 carboxyl groups per molecule) was reacted with 30 parts of bisphenol A type epoxy resin (having a number-average molecular weight of 380 and containing 2 epoxy groups per molecule) at 150° C. for 1 hour. To the reaction product was added 40 parts of MEK and 25 parts of toluene. Thus there was obtained CTBN-Ep containing 65% of non-volatile material.

Reaction of CTBN-Ep with P:

100 parts of phenol was reacted with 128 parts of 37.2% formalin in the presence of 2 parts of 28% ammonia water as a catalyst at 100° C. for 40 minutes, followed by dehydration under reduced pressure. To the reaction product was added 100 parts of previously obtained CTBN-Ep, followed by reaction at 90° C. for 30 minutes. To the reaction product was added MEK to give CTBN-Ep-P containing 60% non-volatile material.

Reaction of CTBN-Ep-P with melamine-formaldehyde resin:

To 250 parts of melamine and 223 parts of paraformaldehyde (80%) was added 240 parts of methanol. The reactants were adjusted to pH 6, and reaction was carried out at 80° C. for 1 hour. Then, 285 parts of previously obtained CTBN-Ep-P was added, followed by reaction at 90° C. for 30 minutes. To the reaction product were added 100 parts of MEK and 100 parts of toluene to give a resin solution containing 50% of non-volatile material.

Preparation of test piece of friction material:

The resin solution obtained as described above was diluted to 25% resin content. In this diluted solution was dipped glass roving, followed by drying at 80° C. for 20 minutes in a drier. The resin-impregnated glass roving was then molded at 160° C. under a pressure of 100 kg/cm$^2$ for 10 minutes, followed by baking at 230° C. for 3 hours.

COMPARATIVE EXAMPLE

The procedure outlined above was repeated except that the CTBN-Ep-P reacted with the melamine-formaldehyde resin was replaced with 285 parts of Phenolic Resin (P). Thus, a P-melamine-formaldehyde resin was obtained. Using this resin, a test piece of friction material was prepared using the procedure outlined above.

The test pieces prepared in Example and Comparative Example were examined for friction characteristics according to JIS D-4311. The results are shown in Table 1.

TABLE 1

| Measuring Temperature (°C.) | Example | | Comparative Example | |
|---|---|---|---|---|
| | Coefficient of Friction | Wear Rate ($\times 10^{-7}$ cm$^3$/kg-m) | Coefficient of Friction | Wear Rate ($\times 10^{-7}$ cm$^3$/kg-m) |
| 100 | 0.45 | 1.5 | 0.49 | 2.0 |
| 150 | 0.42 | 4.0 | 0.40 | 6.0 |
| 200 | 0.41 | 6.5 | 0.42 | 10.5 |
| 250 | 0.40 | 12.5 | 0.38 | 19.5 |

It is noted from Table 1 that the specimen of the Example is stable regardless of temperatures and has a somewhat lower wear rate than that of the Comparative Example.

In the Example, the impregnated glass roving after drying at 80° C. was flexible and no separation occurred between the resin and the glass fiber.

The test piece in Example did not become fluffy when its surface was ground.

We claim:

1. A resinous composition for friction materials comprising a liquid resole phenolic resin modified with a reaction product of an acrylonitrile-butadiene liquid rubber which contains carboxyl groups, and an epoxy resin which contains 1.5 to 2.5 epoxy groups per molecule, and with a triazine resin compound.

2. A resinous composition according to claim 1, wherein the acrylonitrile-butadiene liquid rubber contains about 5 to about 50% acrylonitrile, and contains 1.5 to 2.5 carboxyl groups per molecule.

3. A resinous composition according to claim 1, wherein the reaction product of the acrylonitrile-butadiene rubber-epoxy resin has epoxy group/carboxyl group ratio of 1 to 10, in the starting materials.

4. A resinous composition according to claim 3, wherein the epoxy group/carboxyl group ratio is 1.5 to 5.

5. A resinous composition according to claim 1, wherein the phenolic resin is modified with the acrylonitrile-butadiene-epoxy reaction product in the range of about 10 to 100 parts reaction product per 100 parts of phenolic resin.

6. A resinous composition according to claim 5, wherein the acrylonitrile-butadiene-epoxy reaction product is reacted in the range of 20 to 80 parts reaction product per 100 parts phenolic resin.

7. A resinous composition according to claim 1, wherein the phenolic resin modified with the acrylonitrile-butadiene-epoxy reaction product is reacted with a triazine resin in the ratio of 90:10 to 10:90.

8. A resinous composition according to claim 7, wherein the ratio of modified phenolic resin:triazine resin is 20:80 to 70:30.

9. A resinous composition for friction materials comprising a liquid resole phenolic resin modified with:
   (a) the reaction product of an acrylonitrile-butadiene liquid rubber and an epoxy resin, wherein the acrylonitrile-butadiene rubber contains 5 to 50% acrylonitrile, 1.5 to 2.5 carboxyl groups per molecule, said epoxy resin contains 1.5 to 2.5 epoxy groups per molecule and,
   (b) followed by modification with a triazine resin.

10. A resinous composition according to claim 9, wherein the reaction product is prepared having a epoxy group/carboxyl group ratio of 1 to 10.

11. A resinous composition according to claim 10, wherein the epoxy group/carboxyl ratio is 1.5 to 5.

12. A resinous composition according to claim 9, wherein the phenolic resin is modified with the reaction product of the acrylonitrile-butadiene-epoxy reaction in the range of 10 to 100 parts reaction product per 100 parts phenolic resin.

13. A resinous composition according to claim 12, wherein the reaction product is employed in the range of 20 to 80 parts per 100 parts phenolic resin.

14. A resinous composition according to claim 9, wherein the phenolic resin modified with the acrylonitrile-butadiene-epoxy reaction product is modified with a triazine resin in the ratio of 90:10 to 10:90.

15. A resinous composition according to claim 14, wherein the ratio of modified phenolic resin:triazine resin is 20:80 to 70:30.

* * * * *